United States Patent [19]

Little et al.

[11] 3,938,143

[45] Feb. 10, 1976

[54] BUZZER

[75] Inventors: Arthur J. Little, Springfield; William R. Mayer, Rochester, both of Ill.

[73] Assignee: Stewart-Warner Corporation, Chicago, Ill.

[22] Filed: May 7, 1973

[21] Appl. No.: 357,551

Related U.S. Application Data

[62] Division of Ser. No. 191,861, Oct. 22, 1971, Pat. No. 3,768,158.

[52] U.S. Cl. .................... 340/402; 340/392; 29/594

[51] Int. Cl.[2] ........................ G01K 1/08; G10K 1/00

[58] Field of Search ........... 340/402, 403, 384, 388, 340/392; 335/17; 29/592, 594, 606, 622

[56] References Cited

UNITED STATES PATENTS

| | | | |
|---|---|---|---|
| 3,263,306 | 8/1966 | Chapin et al. | 29/622 |
| 3,618,080 | 11/1971 | Frey | 340/402 X |
| 3,631,480 | 12/1971 | Head | 340/402 X |
| 3,760,411 | 9/1973 | Youhanaian | 340/402 |

*Primary Examiner*—John W. Caldwell
*Assistant Examiner*—William M. Wannisky

[57] ABSTRACT

A warning buzzer having an armature arranged to strike the wall of the cavity formed by the buzzer housing to increase the sound emitted thereby. The buzzer includes terminals molded in a base with one terminal having a coil core and magnetic return leg formed thereon with the coil bobbin received on the core having a pair of lugs on which the coil terminals are wrapped and dip soldered. The dip soldered lugs are then staked in the terminal and in a contact member for both supporting the coil and extending electrical connections thereto.

4 Claims, 9 Drawing Figures

BUZZER

This application is a division of U.S. patent application Ser. No. 191,861, filed Oct. 22, 1971 now U.S. Pat. No. 3,768,158 and relates in general to buzzers and more particularly to an improved and more economical buzzer.

BACKGROUND OF THE INVENTION

DESCRIPTION OF THE PRIOR ART

Buzzers are frequently used in vehicles to either warn the occupant that he has failed to fasten his seat belt, or that he has left the key in the ignition switch when leaving the vehicle. The buzzer is a relatively small and inexpensive device that includes a plastic housing which receives a base carrying a pair of terminals, a coil connected at one end to one of the terminals, an armature connected to the other terminal and biased into engagement with a contact member connected to the other end of the coil to energize the coil. The coil in turn attracts the armature which either strikes a stop or a loud speaker to create an audible warning or noise while deenergizing the coil to enable the warning to be repeated. Striking the stop does not provide sufficient noise because of the smallness of the parts, while the use of a separate loudspeaker is expensive. A related problem is the completion of an electrical circuit to the coil and support therefor, since the coil leads are usually soldered to respective terminals and the coil bobbin separately staked to a support, thus requiring independent operations.

SUMMARY OF THE INVENTION

The present invention provides an integrally formed wall structure on the housing for engagement by the armature in response to the energization of the coil to cause the emission of a loud noise that serves as a warning.

The coil leads are wrapped around respective lugs on the coil bobbin and then dip soldered. The soldered leads and lugs are staked to metal supports on one of the terminals and the contact member so that both electrical connections and support for the coil are provided in a single structure.

In manufacturing the buzzer, a single stamping is formed having the metal structure or configuration for four buzzers including the terminals, the coil core, a magnetic circuit return leg and the contact member interconnected by web portions so that the stamping may be inserted as a unit into respective mold cavities for simultaneously molding a plastic base thereto for each of the four buzzers. Thereafter, the interconnecting web portions are sheared to separate the respective buzzers, and the metal interconnections of each buzzer to enable the respective electrical functions.

It is therefore an object of the present invention to provide improved and more economical buzzers.

It is another object of the present invention to provide an improved and more economical buzzer manufacturing process.

Other objects and features of the present invention will become apparent on examination of the following specification and claims together with the drawings.

DESCRIPTION OF THE BUZZER AND METHOD OF FABRICATION

Figure 1:
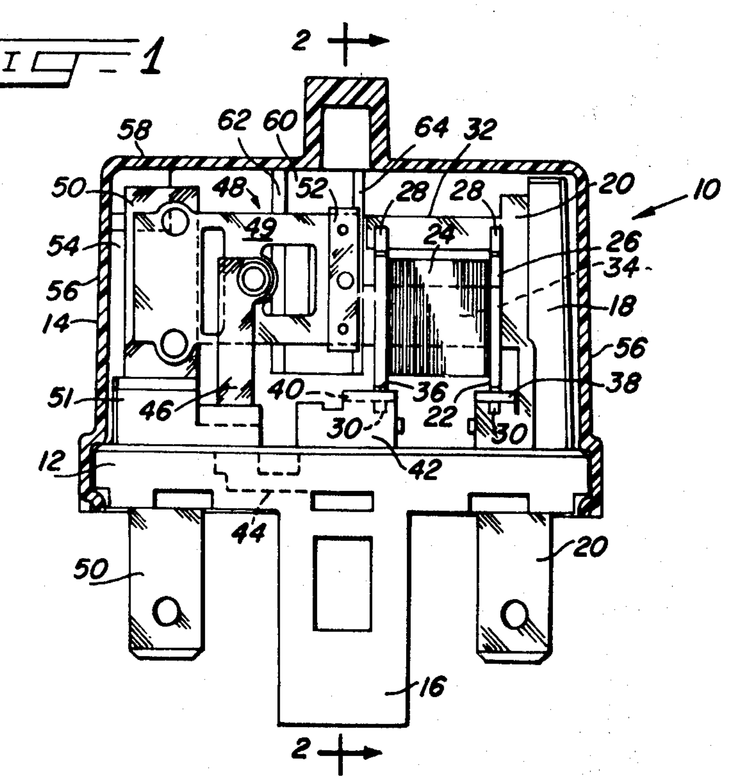
FIG. 1 is a partial sectional view of a buzzer incorporating the principles of the present invention.

Referring now to FIG. 1, a buzzer incorporating the principles of the present invention is indicated by the reference character 10. The buzzer 10 includes a generally planar rectangular base 12 of molded plastic and a cup-shaped housing 14 of generally rectangular cross section with the housing open end secured to the base 12.

Figure 3:
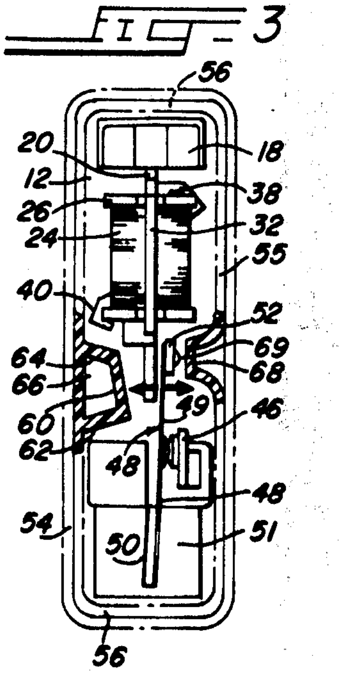
FIG. 3 is a sectional view taken along the line 3—3 in FIG. 2 looking in the direction of the arrows.

The base 12 has rectangular shaped integral lug 16 projecting outwardly of the base along one elongate side of the base, as seen in FIG. 3, with the lug 16 having an opening therein to provide engagement with an appropriate support and connector structure. A second lug 18 formed along one of the short sides of base 12 projects into the housing 14 and partially encapsulates an elongate terminal 20, which projects through base 12 for extending an electrical connection to one terminal 22 of a coil 24. The lug 18, therefore, serves to rigidify and support the terminal 20.

The coil 24 is wound on a bobbin 26 having a pair of upwardly and downwardly extending lugs 28 and 30, respectively. The lugs 30 are slotted to receive a horizontal or right angle magnetic circuit return leg 32, integrally formed adjacent the upper end of terminal 20. The bobbin 26 is received on a second horizontal or right angle leg 34 integrally formed on terminal 20 a short distance below leg 32 with leg 34 serving as the coil core.

The coil lead or terminal 22 is wound on one bobbin lug 30 and the other coil lead or terminal 36 is wound on the other bobbin lug 30. Both terminals 22 and 36 are dip soldered to hold the coil wire in position on the bobbin lugs 30. The lugs 30 with the dip soldered terminals 22 and 36 thereon are then inserted in respective slots formed in respective right angle metal fingers 38 and 40. The finger 38 is formed on terminal 20 above and generally parallel to the base 12 and the finger 40 is formed in a similar position relative the base on a leg 42 of a U-shaped contact member 44. The slots in fingers 38 and 40 are then staked closed to both support the bobbin 26 and coil 24 and insure good electrical contact to the coil 24 from the fingers 38 and 40.

The U-shaped contact member 44 has a back leg embedded in base 12 and a contact leg or blade 46 projecting upwardly from the base 12 parallel to terminal 20, but offset from the elongate central axis of base 12. A contact is carried by the leg 46 adjacent its upper end for engagement with a contact carried intermediate the ends of a cantilever supported armature 48. The armature 48 comprises a reed or spring 49 fixed at one end to an elongate terminal 50 which extends through a rigidifying boss 51 on base 12 and through the base for extending an electrical connection through the spring 48 to the spring contact. A magnetically susceptible strap 52 is fixed to the other or free end of spring 49 spaced adjacent the end of leg 34 for attracting the armature toward the leg 34 and to provide weight at the reed or spring end.

As previously stated, the housing 14 is of a rectangular cup-shape having a peripheral wall defined by elongate side walls 54 and 55 and short end walls 56, and the back is defined by a top wall 58. Side wall 54 is provided with an inwardly spaced wall 60 intermediate the ends of wall 54 and integrally joined to wall 54 by end or side walls 62 and 64. Walls 60, 62 and 64 extend from the back wall 56 of the housing to a position somewhat above the fingers 38 and 40 to form a cavity 66 with the wall 60 being located at an angle of substantially 11° to the elongate central axis of the base 12 and parallel to the position of the spring when it swings past the central axis on energization of coil 24 to engage wall 60. An indented wall portion 60 is provided in wall 55 opposite wall 60 for engagement by a slight projection 69 on strap 52 to cause the emission of a loud noise.

In operation, the coil 24 is energized from one battery terminal concented through terminal 20, terminals 22 and 36 at opposite coil ends, U-shaped member 44, leg 46, the spring 49 and terminal 50 connected to the opposite battery terminal on operation of an appropriate switch. The energized coil 24 attracts armature 48 which swings towards the core leg 34 and separates the spring contact from the contact on leg 46.

As the contacts separate, the coil 24 is deenergized; however, the reed or spring 49 together with the weight or strap 52 are carried by their momentum towards wall 60. The spring 49 then swings back under its spring tension to reengage the spring contact with the contact on blade 46 to reenergize the coil 24 and repeat the process. When the spring and blade contacts reengage, the spring 42 flexes about the contact on blade 46 due to the momentum of the strap 52 for striking the indentation or wall 68 to create a loud noise. The walls 60 and 68 also limit the armature travel to prevent overstressing of the armature in the event the buzzer is dropped.

Figure 2:
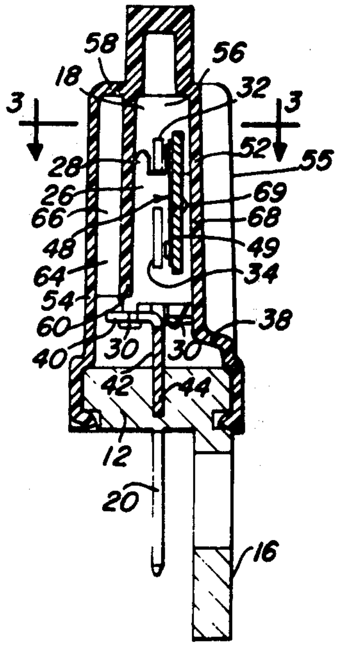
FIG. 2 is a sectional view taken along the line 2—2 in FIG. 1 looking in the direction of the arrows.
Figure 4:
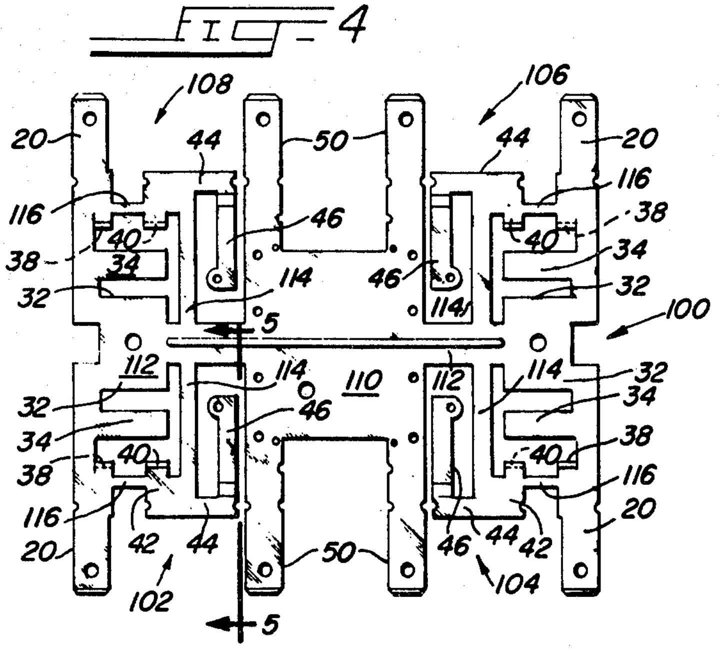
FIG. 4 is a top elevational view of the stamping utilized in fabricating the buzzer.
Figure 5:
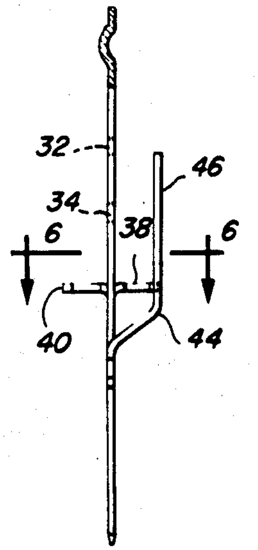
FIG. 5 is a sectional view taken along the line 5—5 in FIG. 4 and looking in the direction of the arrows.
Figure 6:
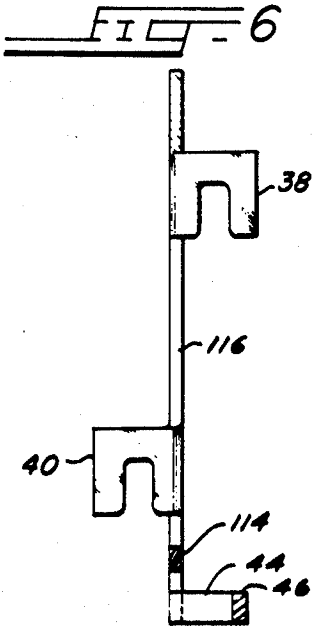
FIG. 6 is a sectional view taken along the line 6—6 in FIG. 5 and looking in the direction of the arrows.

To fabricate the buzzer 10, a generally rectangular stamping 100 is formed as shown in FIG. 4. The stamping 100 is pierced to fashion the metal portions 102, 104, 106 and 108 for four buzzers, each at a respective corner of the stamping 100 with parts corresponding to those indicated in FIGS. 1–3 marked with corresponding reference characters. It will be noted that the configuration of portions 102 and 108 corresponds to that of portions 104 and 106, respectively, rotated through an angle of 180° about a vertical axis, while the configuration of portions 106 and 108 corresponds to that of portions 104 and 102 rotated through 180° about a horizontal axis.

Blade 46, together with fingers 38 and 40, are formed in the stamping 100 in their final offset position from the plane of the terminals 20 and 50 and the four buzzer portions 102, 104, 106 and 108 are joined to each other by a central web portion 110 interconnecting the adjacent ends of respective terminals 50. The web portion 110 in turn has a respective second web portion 112 extending between the portions 102 and 108 and between portions 104 and 106 to the adjacent ends of terminals 20. A web portion 114 joins the leg 42 of the U-shaped contact member 44 to web 112 and a web portion 116 connects leg 42 to terminal 20. Thus, both the individual metal parts and the metal of four buzzers may be handled as a unit for insertion into appropriate mold cavities for forming respective bases 12, since all parts have a metal portion interconnecting the parts. If desired, additional stampings such as 100 may be inserted in stacked arrays in appropriate mold cavities for simultaneous molding of additional bases 12.

Figure 7:
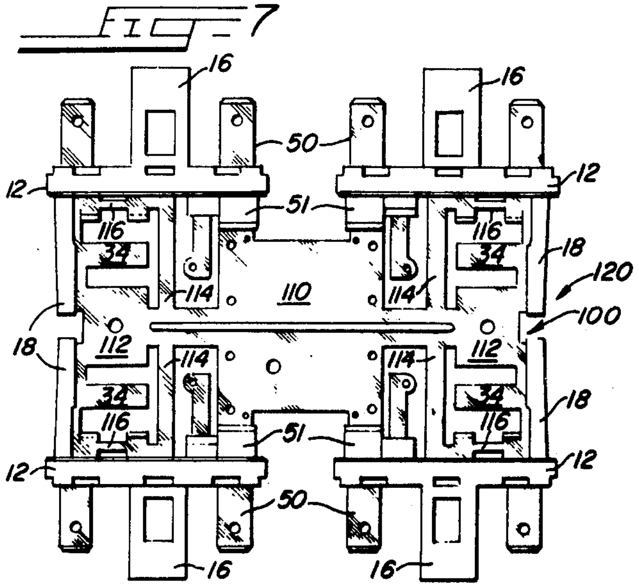
FIG. 7 is a top elevational view of the stamping shown in FIG. 4 with a plurality of bases molded thereto.
Figure 8:
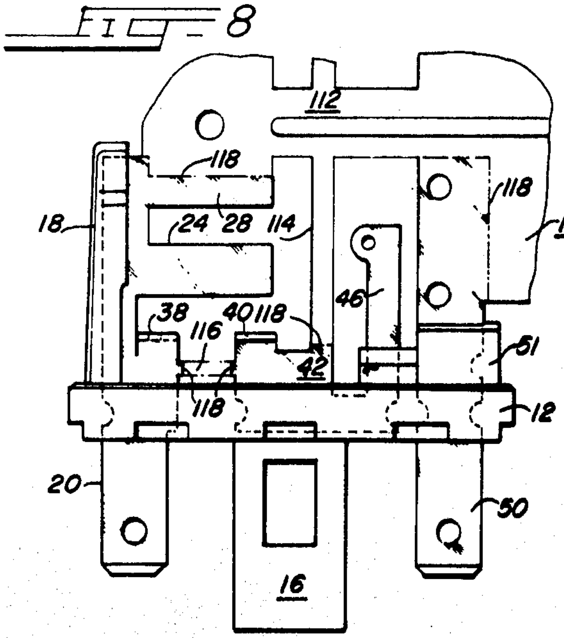
FIG. 8 is an enlarged fragmentary view of a portion of the stamping shown in FIG. 7 together with one base.
Figure 9:
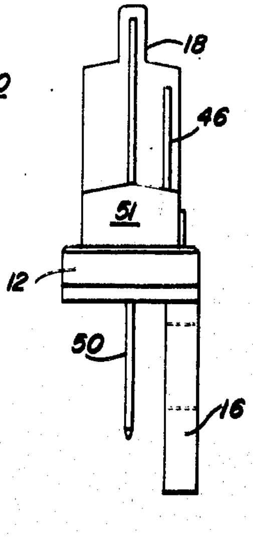
FIG. 9 is a side elevational view of the fragment shown in FIG. 8 after shearing.

A base 12 for each of the buzzers is molded in a respective position on portions 102, 104, 106 and 108 of the stamping 100 to provide the arrangement 120 seen in FIG. 7. As can be seen from FIGS. 7 and 8, the molded base 12 in each corner of the stamping 100 includes the leg 18 to rigidify terminal 20 and boss 51, which extends to blade 46 to support the blade and terminal 50. Molding bases 12 on portions 102, 104, 106 and 108 enables the respective web portions 110, 112, 114 and 116 to be sheared, as shown by broken lines marked 118 in FIG. 8, without deforming the metal or plastic portions, and leaves the contact member 44 of each buzzer separated from terminals 50 and 20 to enable the electrical circuit functions to be completed. Weights or straps 52 are stamped from the relatively large web portion 110 and fixed to spring 49, which in turn is fixed to terminal 50. The four buzzers are individually completed by assembly thereto to respective coils and housings.

The foregoing description of an improved buzzer and method of fabrication includes inventive concepts believed set forth in the accompanying claims.

What is claimed is:

1. A buzzer comprising a molded insulated base carrying a pair of electrical terminals spaced longitudinally relative said base and extending through the base, a coil having ends, a bobbin carrying said coil and having a pair of spaced lugs with a coil end wrapped around each lug, a contact member spaced intermediate said terminals carrying a contact at one end with the other end of said member fixed in said base, an armature fixed to one terminal and biased in one direction into engagement with said contact, a cup-shaped housing having an open end receiving said base and defined by a peripheral wall and a back wall with said terminals, contact member and bobbin encircled by said peripheral wall, a first integral wall spaced inwardly of said peripheral wall for engagement by said armature in a direction for engaging said contact and extending from said back wall to a position spaced from said base, another integral wall spaced inwardly of said peripheral wall and extending from said back wall to a position spaced from said base, a pair of walls integrally formed between said other inwardly spaced wall and peripheral wall and of substantially the same length as said inwardly spaced wall to form a cavity, a core integrally formed on the other of said electrical terminals and carrying said bobbin, a solder coating on each end of said coil to secure the respective coil end to a respective lug, a finger integrally formed with said contact member and having a slot for receiving one lug, and a finger integrally formed on said other terminal and having a slot for receiving said other lug to support said coil in response to the deformation of said fingers against a respective lug and establish an electrical connection from said other terminal through said coil and contact member to said armature and one terminal for energizing said coil to move said armature from said contact to deenergize said coil, whereafter said biased armature reengages said contact and said first wall.

2. A buzzer comprising a molded base carrying a pair of electrical terminals extending through the base, a coil having ends, a bobbin carrying said coil and having a pair of spaced lugs each connected to a respective coil end, a contact member having one end fixed in said base and having a contact at the contact member other end, an armature, means for cantilever supporting said armature on one of said terminals and biasing said armature into engagement with said contact for movement through an elongate axis of said armature in response to energization of said coil to a position offset from said axis, a cup-shaped housing having an open end engaged with said base and defined by a peripheral wall, and a wall integrally formed on said housing spaced inwardly of said peripheral wall for engagement by said armature in response to energization of said coil for creating an audible sound, said inwardly spaced wall extending from the back wall of said housing to a position spaced adjacent said base, each coil end connected to a respective lug to hold each coil end on a respective lug, and a respective finger on the other terminal and on said contact member with each finger having a slot for receiving a respective lug and deformed about a respective lug to both support said coil and electrically connect each finger to said coil for enabling energization of said coil through said one terminal, armature, contact and other terminal for moving said armature through said axis for deenergizing said coil, whereafter said armature reengages said contact to reenergize said coil, a coil core integrally formed on said other terminal for receiving said bobbin, and a magnetic return leg integrally formed on said other terminal parallel to said core.

3. In the buzzer claimed in claim 2, a pair of spaced slotted lugs on said bobbin for receiving said return leg.

4. A buzzer comprising a molded base of electrically insulating material, a pair of electrical terminals spaced longitudinally relative said base and extending through said base and molded in said base for securing said terminals to said base, a coil having ends, a bobbin of electrically insulating material carrying said coil and having a pair of spaced lugs with each lug having a coil end secured thereto, a contact member carrying a contact at one end and spaced longitudinally intermediate said terminals, the other end of said contact member molded in said base to secure said contact member in said base, an armature fixed to one terminal and biased in one direction into engagement with said contact, a cup-shaped housing having an open end receiving said base and defined by a peripheral wall and a back wall with said terminals, contact member and bobbin encircled by said peripheral wall, a finger integrally formed with said contact member and secured to one of said bobbin lugs with said finger electrically connected to one of the coil ends, another finger integrally formed on said other terminal and secured to the other bobbin lug with said other finger electrically connected to the other coil end to thereby support said coil and extablish an electrical connection from said other terminal through said coil and contact member to said armature and one terminal for energizing said coil to move said armature from said contact to deenergize said coil, whereafter said biased armature reengages said contact, and means on said armature for engaging a sounding means in response to each energization of said coil for creating an intermittent sound.

* * * * *